United States Patent Office 3,692,552
Patented Sept. 19, 1972

3,692,552
LIQUID LAUNDRY STARCH
Hans Rüggeberg, Hilden, Rhineland, Germany, assignor to Henkel & Cie GmbH, Dusseldorf-Holthausen, Germany
No Drawing. Filed July 15, 1970, Ser. No. 55,273
Claims priority, application Germany, Aug. 9, 1969, P 19 40 655.4
Int. Cl. C08b 25/00
U.S. Cl. 106—208          6 Claims

ABSTRACT OF THE DISCLOSURE

A liquid laundry starch comprising an aqueous suspension of starch or starch derivatives in an aqueous solution of xanthan gum and/or water-soluble derivatives of xanthan gum.

THE PRIOR ART

For the starching and sizing of laundry, frequently starch products are used which are applied either as a boiled solution of previously ungelatinized starch or as solution of pre-gelatinized starch, such as swellable starch, or as a suspension of ungelatinized starches which only gelatinize on the laundry during ironing.

The preparations which are used for the starching of laundry can contain in a known way also other substances which improve the hand, the softness or the east of ironing. Since these substances are frequently liquid, it is appropriate to prepare the whole composition in liquid form. Such liquid preparations offer also advantages in dosing and handling.

In order to prevent a precipitation of the starch from the suspensions, a carrier liquor has to be used. As carrier liquor, a solution of carboxymethylcelluloses can, for instance, be utilized. In order to suspend sufficient amount of starch, for example, in the use of the named carboxymethylcellulose, its concentration must be so high that the handling of the suspension is difficult. Also, preparations have been known in which the starch suspension was pre-gelatinized by short-time heating to about 40° to 60° C. This intermediary pre-gelatinized stage can be maintained exactly, only with difficulty. Besides, such preparations thicken considerably in time, and therefore have poor shelf stability.

Because of this, difficulties in dosing arise if the starch suspensions occur, since they have to be further diluted.

OBJECTS OF THE INVENTION

An object of the invention is to develop a liquid laundry starch which has a low and stable viscosity, and is free of the above-described drawbacks.

Another object of the invention is the development of a liquid laundry starch concentrate comprising an aqueous suspension containing from 25% to 45% by weight of a starchy material selected from the group consisting of starch and starch derivatives suspended in an aqueous solution containing from 0.1 to 3.0 parts by weight per 100 parts of water of a suspending agent selected from the group consisting of xanthan gum and water-soluble derivatives of xanthan gum.

These and other objects of the invention will become more apparent as the description thereof proceeds.

DESCRIPTION OF THE INVENTION

I have now discovered that stable liquid laundry starch suspensions can be prepared which have a low and stable viscosity and excellent shelf stability. The invention involves a liquid laundry starch comprising an aqueous suspension of starch or starch derivatives in an aqueous solution of xanthan gum and/or water-soluble derivatives of xanthan gum.

According to the invention, the aqueous phase of the liquid laundry starch consists of a solution of xanthan gum and/or water-soluble derivatives of xanthan gum. Xanthan gum is a polysaccharide which is substantially constituted of glucose, mannose, the potassium salt of the glucuronic acid, and acetyl groups in the approximate molar ratio of 2:1:1:1. It contains, in addition, small amounts of chemically bound pyruvic acid. The preparation of xanthan gum is known (see Journal of Biochemical and Microbiological Technology and Engineering, vol. III, No. 1 (1961), pp. 51–63). The preparation is carried out in known manner by the action of the bacterial strain *Xanthomas campestris* on aqueous solutions of glucose or starch. Xanthan gum is a substance which dissolves easily in water. A 2% aqueous solution has at 20° C. a viscosity between about 2500 and 6500 cp. The solutions of xanthan gum are extraordinarily stable to the addition of chemicals.

Water-soluble derivatives of xanthan gum are its reaction products with alkoxylating agents, such as ethylene oxide, propylene oxide, butylene oxide or with alkylating agents, such as dimethyl sulfate, methyl halide, or halogen-carboxylic acids. Also, these water-soluble derivatives include saponification products, such as are obtained by alkaline deacetylation. These saponification products are frequently distinguished by a favorable rheological behavior.

For the preparation of the liquid laundry starch of the invention, for 100 parts by weight of water from 0.1 to 3, particularly from 0.2 to 1.0 parts by weight of xanthan gum or of a water-soluble derivative of xanthan gum are used.

The liquid laundry starches contain about 25 to 45 percent by weight of starch suspended in the aqueous xanthan gum solution. The amount should be utilized approximately so that the viscosity of the solution at 20° C. lies between 1000 and 4000 cp. All granular starches and starch derivatives can be used, such as corn, rice, or tapioca starch. The starch should preferably be present in the native state. Optionally, it can also be oxidatively, hydrolytically or thermally degraded. All starch derivatives are included under the terms, starch and starch derivatives, insofar as they are insoluble in cold water and gelatinize in hot water.

Approximately, the suspension may contain, in addition, wetting agents, such as alkylbenzene sulfates, fatty alcohol sulfonates or ethylene oxide adducts to fatty alcohol, alkylphenols, or the like.

The liquid laundry starch can also contain additions of lower alcohols, for example lower alkanols, such as ethanol, isopropanol, or lower alkanepolyols, such as ethylene glycol, glycerine as well as lower oxyalkylene glycols such as diethylene glycols. In addition, conventional additives such as perfumes, dyes, and lustering agents, for example, borax, can be present. In many cases it is appropriate to add disinfectants to the liquid laundry starch to prevent bacterial decomposition. Formaldehyde and its derivatives as well as quaternary ammonium compounds, such as tetraalkyl-ammonium-halides and trialkyl-aralkyl-ammonium halides, such as dimethyl-dodecyl-benzyl-ammonium chloride are of interest as disinfectants.

The advantage of the preparation according to the invention consists in the excellent stability of the suspension with a high starch concentration, the very small concentration of xanthan gum, and a relatively small total viscosity.

In the application of liquid laundry starch in use, the suspension is diluted with water so that for 1 liter of the ready-for-use solution about 5 to 50 gm. of starch, particularly 6 to 10 gm. of starch are present. A ten to hundred fold dilution can be made prior to its use. With this dilute suspension, the laundry is impregnated, surface-dried and ironed in a known manner.

The following specific examples are illustrative of the practice of the invention without being deemed limitative.

EXAMPLE 1

0.3 kg. of xanthan gum, made into a paste with 0.6 kg. of ethanol, were added with agitation to 61.4 liters of water. After the xanthan gum was dissolved, the following ingredients were successively added with stirring:

|  | Kg. |
|---|---|
| Borax | 2.5 |
| Glycerine | 5.0 |
| 35% aqueous formaldehyde solution | 0.2 |
| Rice starch | 15.0 |
| Corn starch | 15.0 |

The product had, after preparation, a viscosity of 1600 cp. at 20° C. according to Brookfield. After a storage time of 4 weeks the starch had not precipitated, and the viscosity was 1500 cp.

EXAMPLE 2

Following the procedures described in Example 1, a liquid laundry starch was prepared with the following composition:

| Water | liters | 50.68 |
|---|---|---|
| Xanthan gum | kg | 0.12 |
| Ethylene glycol | kg | 5.0 |
| Ethylene oxide adduct to stearyl alcohol (6 mols of ethyleneoxide to 1 mol of alcohol) | kg | 2.0 |
| Borax | kg | 2.0 |
| Dimethyl-dodecyl-benzyl-ammonium chloride | kg | 0.20 |
| Corn starch | kg | 40.0 |

The viscosity immediately after preparation was 1700 cp. at 20° C., according to Brookfield. After 8 days, the viscosity was 1750 cp.

EXAMPLE 3

In the same way as described in Example 1, a liquid laundry starch was prepared with the following ingredients:

| Water | liters | 63.0 |
|---|---|---|
| Xanthan gum | kg | 0.5 |
| Ethanol | kg | 1.0 |
| Glycerine | kg | 5.0 |
| Borax | kg | 5.0 |
| 35% aqueous formaldehyde solution | kg | 0.2 |
| Corn starch | kg | 20.0 |
| Tapioca starch | kg | 5.0 |

Immediately after preparation, the liquid laundry starch had a viscosity of 3200 cp. at 20° C., according to Brookfield. After 8 days, the viscosity was slightly changed to 3400 cp.

The preceding specific embodiments are illustrative of the practice of the invention. It is to be understood, however, that other expedients known to those skilled in the art may be employed without departing from the spirit of the invention or the scope of the appended claims.

I claim:

1. A liquid laundry starch concentrate comprising an aqueous suspension containing from 25% to 45% by weight of a granular starch suspended in an aqueous solution containing from 0.1 to 3.0 parts by weight per 100 parts of water, of a suspending agent selected from the group consisting of xanthan gum and water-soluble derivatives of xanthan gum consisting essentially of the reaction products of xanthan gum with a member selected from the group consisting of (a) alkoxylating agents selected from the group consisting of ethylene oxide, propylene oxide and butylene oxide, (b) alkylating agents selected from the group consisting of dimethyl sulfate and methyl halide, and (c) the saponification products obtained by alkaline deacetylation.

2. A liquid laundry starch concentrate comprising an aqueous suspension containing from 25% to 45% by weight of a native starch suspended in an aqueous solution containing from 0.1 to 3.0 parts by weight per 100 parts of water of xanthan gum.

3. The liquid laundry starch concentrate of claim 2, wherein said xanthan gum is present in said aqueous solution in an amount of from 0.2 to 1.0 part by weight per 100 parts of water.

4. The liquid laundry starch concentrate of claim 1, containing a further content of a nonionic wetting agent.

5. The liquid laundry starch concentrate of claim 2, containing a further content of conventional additives selected from the group consisting of lower alcohols, perfumes, dyes, disinfectants and lustering agents.

6. A dilute laundry starch comprising one part of the liquid laundry starch concentrate of claim 2 diluted to a starch content of from 5 to 50 gm. per liter with water.

References Cited

UNITED STATES PATENTS 3,232,929   1/1966   McNeely _____ 282—8.5 C

THEODORE MORRIS, Primary Examiner

U.S. Cl. X.R.

106—209, 213